(12) United States Patent
Myatt

(10) Patent No.: US 7,604,029 B2
(45) Date of Patent: Oct. 20, 2009

(54) WEAR INDICATING TIRE

(75) Inventor: David Myatt, Chateaugay (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 501 days.

(21) Appl. No.: 11/611,430

(22) Filed: Dec. 15, 2006

(65) Prior Publication Data

US 2007/0175555 A1    Aug. 2, 2007

Related U.S. Application Data

(60) Provisional application No. 60/771,043, filed on Feb. 6, 2006.

(30) Foreign Application Priority Data

Dec. 15, 2005    (EP) .................................. 05292699

(51) Int. Cl.
*B60C 11/24* (2006.01)
*G01M 17/02* (2006.01)
(52) U.S. Cl. .................... 152/154.2; 152/152.1; 73/146
(58) Field of Classification Search .............. 152/152.1, 152/154.2; 73/146
See application file for complete search history.

(56) References Cited

U.S. PATENT DOCUMENTS

| | | | |
|---|---|---|---|
| 6,147,659 A | | 11/2000 | Takahashi et al. |
| 6,220,319 B1 | * | 4/2001 | Reuter ..................... 152/152.1 |
| 6,289,958 B1 | * | 9/2001 | Dheur et al. ............. 152/152.1 |
| 7,050,017 B2 | * | 5/2006 | King et al. .................. 343/873 |

FOREIGN PATENT DOCUMENTS

| | | | |
|---|---|---|---|
| DE | 2524463 | * | 12/1976 |
| DE | 197 45 734 A1 | | 4/1999 |
| DE | 202 16 290 U1 | | 1/2003 |
| FR | 2645799 | * | 10/1990 |
| JP | 2005-138683 | * | 6/2005 |
| WO | 2004/068769 A2 | | 8/2004 |

* cited by examiner

*Primary Examiner*—Justin Fischer
(74) *Attorney, Agent, or Firm*—Fitzpatrick, Cella, Harper & Scinto

(57) ABSTRACT

A tire including a tread and a belt having a first and a second ply. The first and second plies are made up of substantially parallel metallic reinforcing cords embedded in a rubber composition that are inclined with respect to the equatorial plane of the tire, and the cords of the first ply are inclined with respect to the cords of the second ply. At least one dipolar electric element connects at least one cord of the first ply to at least one cord of the second ply. The path followed by the dipolar electric element between the cord of the first ply and the cord of the second ply extends into a part of the tread so as to be worn away before or upon reaching a tread wear limit.

10 Claims, 3 Drawing Sheets

WEAR INDICATING TIRE

CROSS-REFERENCE TO RELATED APPLICATION

This application claims the benefit of U.S. Provisional Application No. 60/771,043, filed Feb. 6, 2006, which is incorporated herein by reference in its entirety.

BACKGROUND OF THE INVENTION

1. Field of the Invention

The present invention concerns tire wear control, and in particular, tires that allow automatic detection that a predetermined tire wear threshold has been reached.

2. Related Art

As used herein, the term "cord" is understood to mean a single thread or wire, metallic or non metallic, or an assembly of several threads or wires. "Ply" refers to a layer of parallel reinforcing cords, metallic or non metallic, woven or unwoven, and embedded in a rubber composition, the thickness of the ply being close to the diameter of an individual cord. "Belt" refers to an assembly of at least two plies that is unanchored to the bead. "Axial" refers to a direction essentially parallel to the rotation axis of a tire. "Radial" refers to a direction parallel to a vector perpendicular to the axial direction and which intersects the rotation axis of the tire. "Tire" refers to pneumatic or non pneumatic tires.

As is known, the tread of a tire undergoes wear that results from the rolling of the tire on the ground. If the tread has grooves, the effect of this wear is to reduce the depth of the grooves, thereby degrading the performance of the tire on wet ground. On reaching a certain wear level, referred to as "tread wear limit", the tire no longer enables rolling to take place under optimum conditions. The tire or its tread ("retreading") is then replaced and scrapped or, if the residual thickness of the tread so allows, the grooves of the tread are cut out afresh.

The wear level of a tread can be monitored by measuring the depth of the grooves, but that operation is often neglected because it is considered troublesome and because it requires a suitable measuring tool, which may not always be at hand. It has therefore long been proposed to position wear indicators on the rolling surfaces so as to visually alert the driver of the vehicle when the minimum tread groove depth has been reached. The prior art contains an almost innumerable variety of propositions to provide pieces of colored rubber within the tire tread which appear on the tread surface when a tire wear threshold is reached. Industrial applications of such colored wear indicators have nevertheless remained relatively rare, not least because their precise positioning within the tread is difficult to obtain and costly. More common visual tire wear indicators take advantage of the visual contrast between the rubber forming the tread and a groove or cavity in the the tread.

Irrespective of their precise nature, visual tire wear indicators have the drawback that the user has to has to periodically inspect the tires in order to realize when the wear limit is reached. It has therefore been proposed (see, for example, US 2002/0036039) to monitor the tread wear, as revealed by such wear indicators, by image analysis, which can be used to generate an alert signal as soon as the wear limit is reached.

Another, more direct way of obtaining information on the tread wear is to use magnetic or electrical sensors whose signals are altered as a function of tread wear.

There have been several proposals to use magnetic properties of the tread itself in order to detect the progress of wear. For example, DE 199 54 825 divulges the use of tread blocks made from magnetic rubber, the presence (or absence) of which is detected. DE 199 57 645 extends this concept to providing areas of alternating magnetic polarity in the depth of the tread.

Another approach is to provide conductors inside the tread and to detect changes of measurable parameters related to the removal of these conductors by wear. DE 25 24 463 divulges the idea of incorporating an electrical conductor into the tread, such that the conductor is cut as soon as the wear limit is reached. The same concept has later been proposed by JP 61-150 804.

DE 197 45 734 describes the use of a sensor comprising a number of conductive loops which extend at different heights in the tread and open successively as tread wear progresses, so that they form open switches; a detection circuit delivers a corresponding signal to an assessment unit present in the vehicle.

DE 199 30 046 describes a tread containing a bundle of metallic cords located precisely at the minimum lawful profile depth and wearing away when the profile is worn below this depth. An induction current passing through the bundle changes as the diameter reduces and initiates an audible and/or visual warning.

WO 03/031208 describes a method consisting in measuring the electrical resistance or capacitance inside a tread block and deducing the height of the block therefrom.

US 2005/061069 teaches the incorporation into the tire of a resonant circuit comprising several capacitors connected in parallel by means of conductive branches which extend into the tread. When the tread is worn, the branches extending into the worn part break, which changes the tuning frequency of the resonant circuit.

The present invention aims at improving this concept by simplifying the underlying tire structure, taking advantage of the electromagnetic behavior of the tire's belt.

SUMMARY OF THE INVENTION

This goal is achieved by a tire comprising a tread and a belt comprising a first and a second ply, the first and second plies being made up of substantially parallel metallic reinforcing cords embedded in a rubber composition that are inclined with respect to the equatorial plane of the tire, the cords of the first ply being inclined with respect to (and preferentially inclined oppositely to) the cords of the second ply, wherein at least one dipolar electric element connects at least one cord of the first ply to at least one cord of the second ply, the path followed by the dipolar electric element between the cord of the first ply and the cord of the second ply extending into the part of the tread that can be worn away before reaching the tread wear limit. Consequently at least one characteristic of the dipolar electric element is modified as a consequence of tire wear before or when the tread wear limit is reached.

In other words, the invention is directed to a tire comprising a tread and a belt comprising a first and a second ply, the first and second plies being made up of substantially parallel metallic reinforcing cords embedded in a rubber composition that are inclined with respect to the equatorial plane of the tire, the cords of the first ply being inclined with respect to (and preferentially inclined oppositely to) the cords of the second ply, the tire moreover comprising at least one resonant circuit formed by a plurality of inductances and capacities and at least one dipolar electric element connecting capacities of the resonant circuit and extending into the part of the tread that can be worn away before reaching the tread wear limit, such that at least one characteristic of the dipolar electric element is modified as a consequence of tire wear before or when the tread wear limit is reached, the resonant circuit being formed by elements of the belt of the tire.

According to a first preferred embodiment, the dipolar element is a capacitor whose capacity is continuously modified as a consequence of tire wear. The capacitor may be a variable capacitor which is arranged such that the capacity of the capacitor changes as a function of tire wear. Thus an in situ measurement of the degree of wear is made possible.

According to a second preferred embodiment, the dipolar element is a resistance whose resistance value is modified as a consequence of tire wear.

In a first variant of this concept, the resistance is designed to break when a predetermined wear threshold is reached. The measurement is of the "all or nothing" type and only allows to determine whether the threshold has been reached or not; there is no information on the actual degree of wear.

In a second variant, the resistance is a variable resistance which is arranged such that its resistance value changes as a function of tire wear. Therefore an in situ measurement of the degree of wear can be obtained.

Of course, it is possible to combine the first and the second embodiments by using a dipolar element that has both capacitive and resistive properties.

BRIEF DESCRIPTION OF THE DRAWINGS

The invention may be better understood by reference to the detailed description which follows and to the drawings, in which.

DESCRIPTION OF PREFERRED EMBODIMENTS

Figure 1:
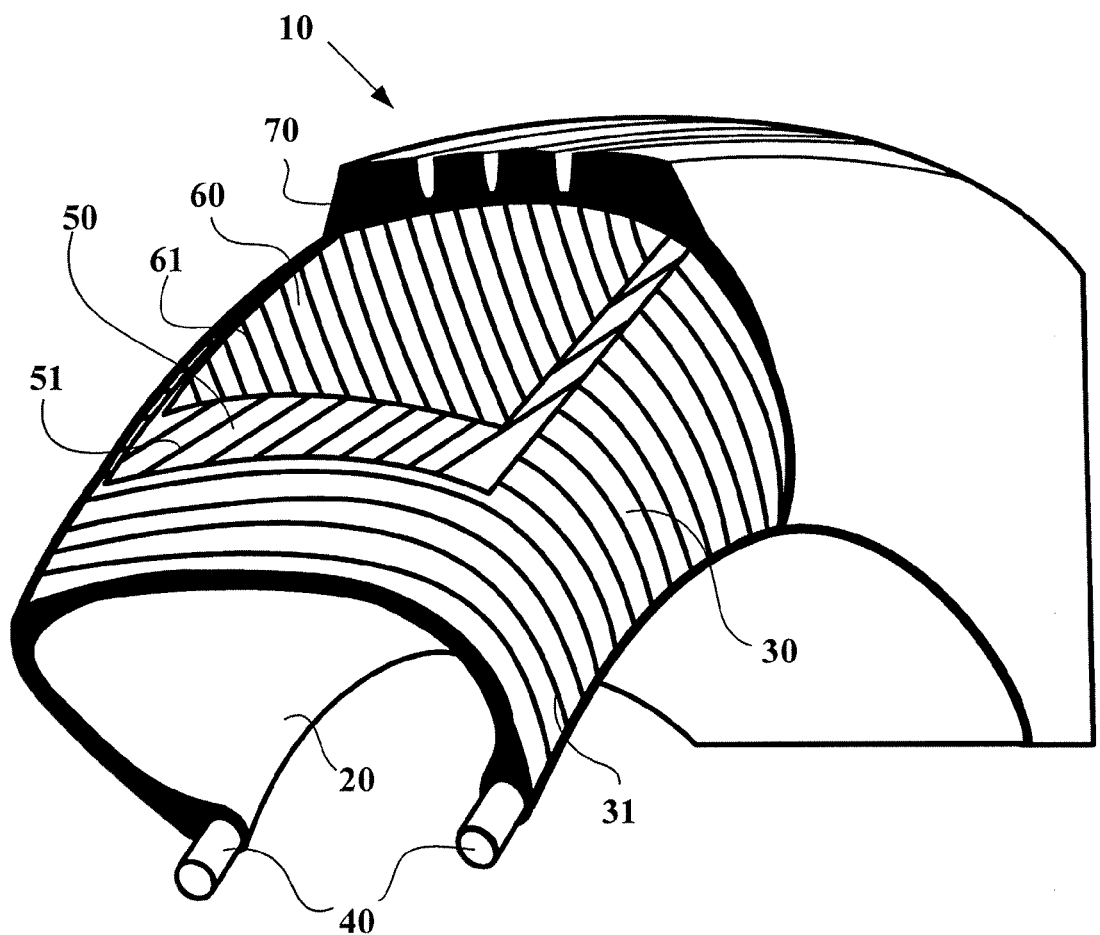
FIG. 1 is a schematic view of a pneumatic radial tire.

FIG. 1 schematically represents the structure of a radial pneumatic tire 10 comprising an inner liner 20 made of airtight synthetic rubber, a carcass ply 30 composed of textile cords 31, laid down in straight lines and sandwiched in rubber, bead wires 40 holding the tire 10 onto the rim (not illustrated), a breaker belt made of at least two radially adjacent breaker plies 50 and 60, and a tread 70 laid over the breaker plies 50 and 60 to be in contact with the road. Each of the two breaker plies 50 and 60 of tire 10 is reinforced with steel cords 51 and 61 that are inclined with respect to the equatorial plane of the tire at an appropriate angle (typically around 20°). In this embodiment, the cords 51 of one ply are inclined oppositely to the cords 61 of the other ply.

Figure 2:
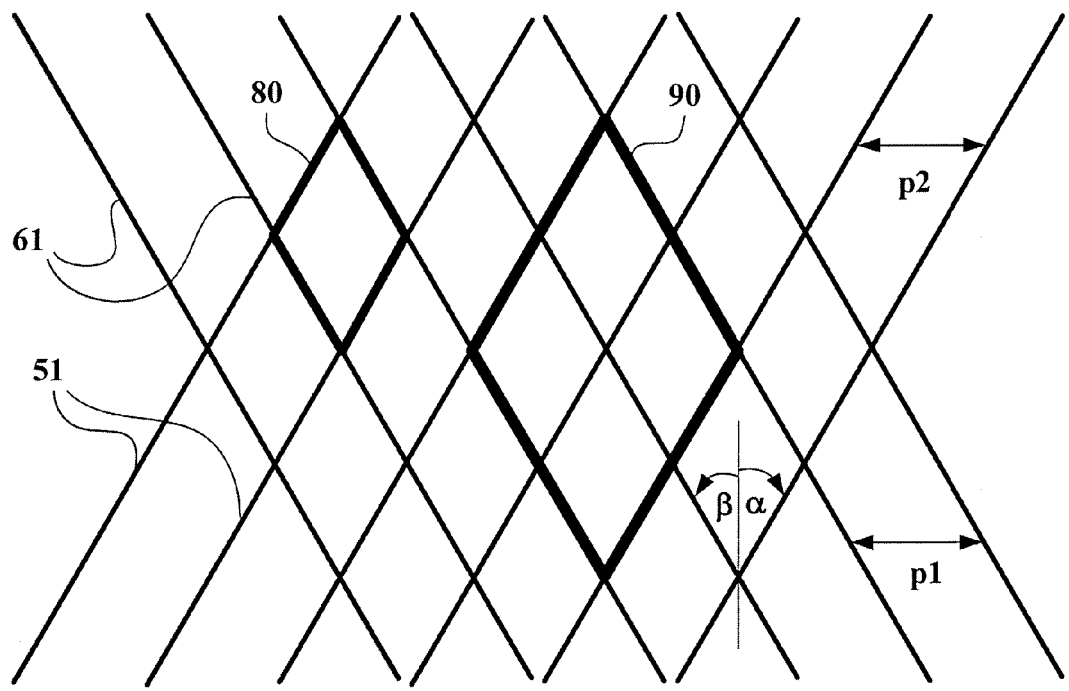
FIG. 2 is a schematic representation of the lattice formed by the cords of two breaker plies.

This particular arrangement of the plies included in the breaker belt explains the strong absorption of electromagnetic radiation in the belt. As schematically represented in FIG. 2, the sets of cords 51 and 61 of the adjacent plies 50 and 60 form a lattice comprising a great number of elementary 80 and composite 90 parallelograms.

Figure 3:
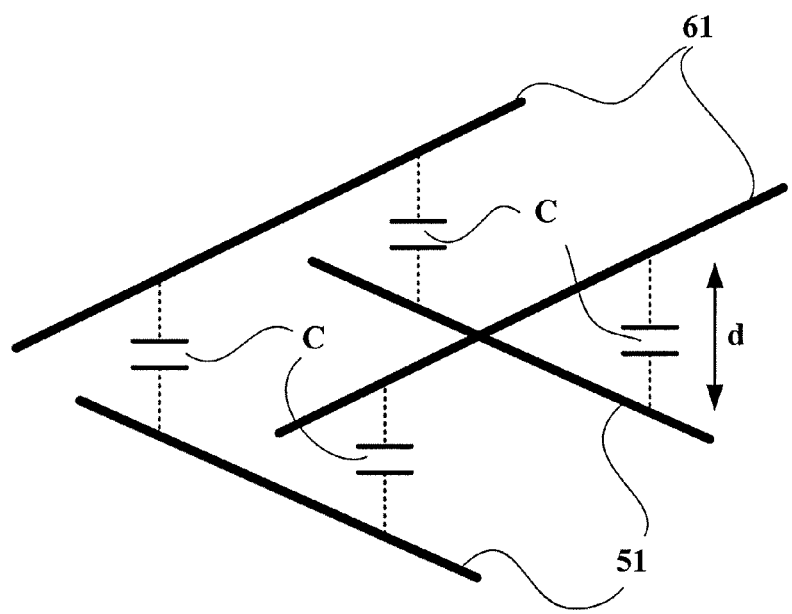
FIG. 3 is a schematic representation of a resonant circuit formed by the cords of two adjacent breaker plies.
Figure 4:
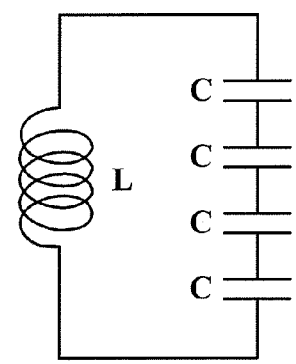
FIG. 4 is a schematic representation of the resonant circuit corresponding to the arrangement of FIG. 3.

As shown in FIG. 3, each of these parallelograms constitutes a resonant circuit. The four sides of the parallelogram formed by parts of cords of the belt can be considered as a loop of inductance L, whereas the cord, rubber composition, cord interface at each of the angles of the parallelogram constitutes a capacitance C. FIG. 4 shows the equivalent LC circuit.

As it is well known, a resonant circuit can be excited by electromagnetic radiation of a frequency that is close to its resonant frequency. The more circuits are excited, the stronger the electromagnetic radiation is absorbed. The great number of circuits of varying shapes (and, therefore, of varying inductance L) present in the belt of a tire explains the fact that the absorption function is of complex shape. Its characteristics are influenced by the nature of the cords 51 and 61, the number and structure of plies 50 and 60, the distance d between adjacent breaker plies 50 and 60, resistivity of the rubber composition used in the breaker plies 50 and 60, the inclination alpha ($\alpha$) and beta ($\beta$) of the cords 51 and 61 of the breaker plies 50 and 60 with respect to the circumference of the tire 10, the pitch p1 and p2 of the breaker plies, the diameter and the high frequency conductivity of metallic cords 51 and 61, etc.

Figure 5:
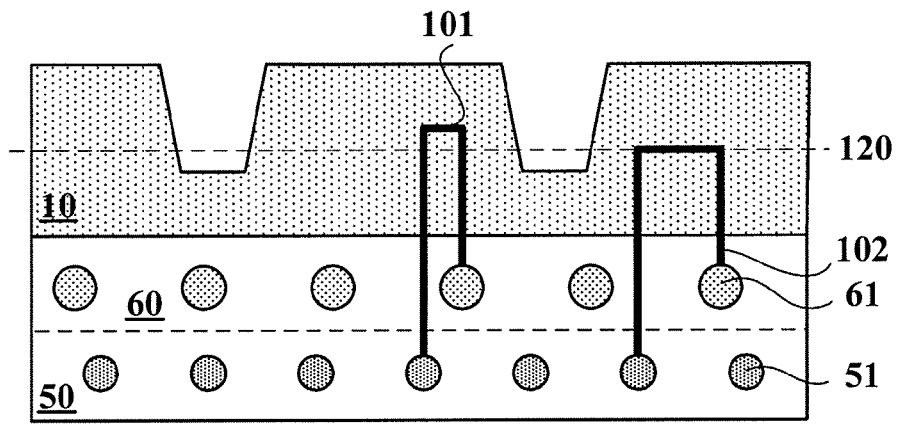
FIG. 5 is a schematic representation of a partial radial section of a tire according to the invention.

The present invention further relates to the use of the resonant circuits formed by the tire belt for measuring the wear of the tire tread. This use may be achieved, for example, by introducing a dipolar connecting element, as shown in FIG. 5. The dipolar elements 101 and 102 connect at least one cord 51 of the first ply 50 to at least one cord 61 of the second ply 60, and extend into the part of the tread 10 that can be worn away before reaching the tread wear limit (indicated by the dashed line 120). In this particular, but non-limiting example, the dipolar elements are electrically conductive staples designed to break before the wear limit is reached (element 101) or exactly when this limit is reached (element 102).

Figure 6:
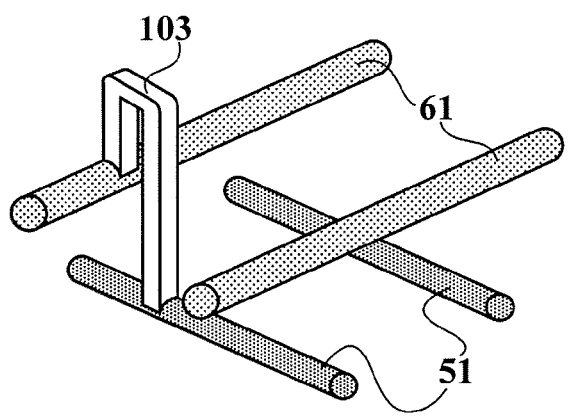
FIG. 6 is a schematic perspective view of cords forming a resonant circuit and a dipolar element connecting two of the cords.

FIG. 6 gives a schematic perspective view of cords 51 and 61 forming a resonant circuit and a dipolar element 103 connecting two of the cords.

Figure 7:
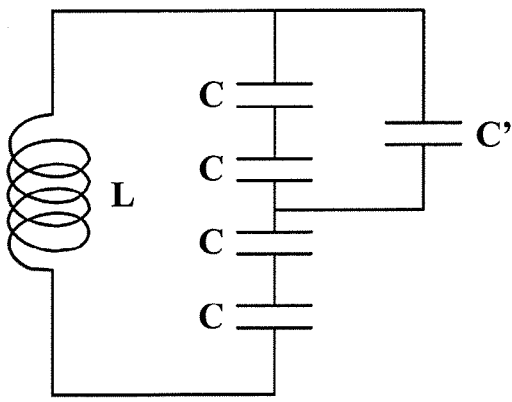
FIGS. 7 and 8 are schematic representations of resonant circuits corresponding to the belt of a tire according to the invention.
Figure 8:
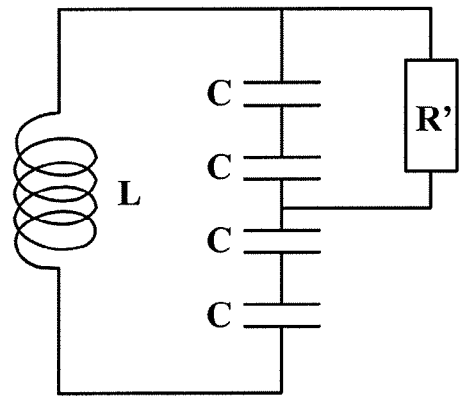

As illustrated in FIGS. 7 and 8, the role of the dipolar elements is to short-circuit, partially, the resonant circuits formed by the cords of the belt and thereby modify the absorption behavior of the belt. As soon as the characteristics of the dipolar elements (capacitance C', resistance value R', etc.) change as a consequence of wear, the absorption behavior of the belt is modified. This modification can be detected at a distance by a detector mounted on the vehicle, using means known to the person skilled in the art, and, for example, be used to trigger an alert signal.

The change of the characteristics of the dipolar element can be abrupt ("all or nothing") in which case it only allows to determine whether the threshold has been reached or not. The dipolar elements represented in FIGS. 5 and 6 are of this type. As soon as the electrically conductive staples break, the resistance value R' (see FIG. 8) increases dramatically, which significantly modifies the resonance frequency of some of the LC circuits formed by the belt.

It is of course possible to use several dipolar elements extending to different heights into the tread (such as elements 101 and 102 of FIG. 5) and to combine the threshold measurements so obtained to reconstruct the degree of wear.

The change in absorption frequency has been measured on a tire belt formed of two plies. When two cords belonging to different plies are short-circuited by a dipolar element, the resonance frequency is 18.8 MHz. This frequency shifts to 20 MHz as soon as the connection between the two cords is broken. The frequency shift of 1.2 MHz is enough to be detected, but it could be increased, for example by increasing the number of dipolar elements or by judiciously choosing the placement of the dipolar element.

Figure 9:
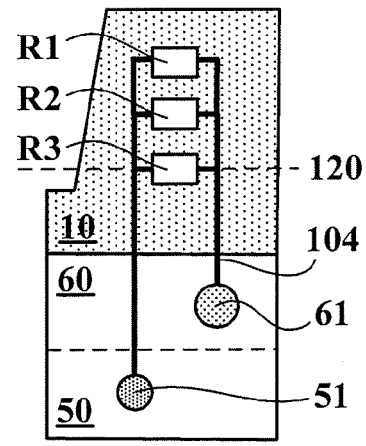
FIG. 9 is a schematic representation of a partial radial section of a tire according to the invention.

It is, however, also possible to have a dipolar element whose characteristics change stepwise or even continuously. If such an element is used, it is possible to carry out a measurement of the degree of wear of the tread block or rib into which the dipolar element extends. A very simple case is represented in FIG. 9. The dipolar element 105 connecting cords 51 and 61 comprises several resistances R1, R2, and R3. As wear progresses, the overall resistance of dipolar element 105 changes, R1, R2, and R3 being removed progressively. When the wear limit 120 is reached, there is no more electrically conductive connection between cords 51 and 61. The person skilled in the art is able, by appropriately choosing the resistance values, to produce a change of the resonance frequency of the resonating circuit, such that the detected frequency can be used to identify the corresponding degree of wear and the quantity of rubber (thickness of rubber) still to be worn before the wear limit is reached.

It goes without saying that the resistances of FIG. 9 could be replaced by capacitances. Combinations of resistances and capacitances could be used as well.

In the examples represented in FIGS. 5 to 8, only two of the four cords forming the resonant circuit are connected by a dipolar element, but this is not a limiting feature. If the four cords are connected by electrically conductive dipolar elements, there is no resonance. Only when at least one of the dipolar elements breaks the resonating circuit begins to effectively resonate, which can be detected by means known to the person skilled in the art.

It is of course possible to combine within a tire some or all of the different embodiments of the invention presented above.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A tire comprising a tread and a belt comprising a first and a second ply, the first and second plies being made up of substantially parallel metallic reinforcing cords embedded in a rubber composition that are inclined with respect to the equatorial plane of the tire, the cords of the first ply being inclined with respect to the cords of the second ply, wherein at least one dipolar electric element connects at least one cord of the first ply to at least one cord of the second ply, the path followed by the dipolar electric element between the cord of the first ply and the cord of the second ply extending into a part of the tread so as to be worn away before or upon reaching a tread wear limit.

2. The tire according to claim 1, wherein the cords of the first ply are inclined oppositely to the cords of the second ply.

3. The tire of claim 1, wherein the dipolar element comprises a capacitor having a capacitance that is modified as a consequence of tire wear.

4. The tire of claim 3, wherein the capacitor comprises a variable capacitor which is arranged such that the capacitance of the capacitor changes as a function of tire wear.

5. The tire of claim 1, wherein the dipolar element comprises a resistance having a resistance value that is modified as a consequence of tire wear.

6. The tire of claim 5, wherein the resistance is positioned so as to be broken when a predetermined wear threshold is reached.

7. The tire of claim 5, wherein the resistance is a variable resistance which is arranged such that its resistance value changes as a function of tire wear.

8. A method for electronically measuring tire wear in a tire comprising a tread and a belt comprising a first and a second ply, the first and second plies being made up of substantially parallel metallic reinforcing cords embedded in a rubber composition that are inclined with respect to the equatorial plane of the tire, the cords of the first ply being inclined with respect to the cords of the second ply, wherein at least one dipolar electric element connects at least one cord of the first ply to at least one cord of the second ply to form a circuit, the path followed by the dipolar electric element between the cord of the first ply and the cord of the second ply extending into a part of the tread so as to be worn away before or upon reaching a tread wear limit, the method comprising:

measuring a resonant frequency of the circuit;

comparing the measured resonant frequency to a predetermined frequency characteristic to determine a parameter indicative of tread wear; and outputting the tread wear parameter to a tread wear monitoring system.

9. The method of claim 8 further comprising outputting an alert indication from the tread wear monitoring system when the tread wear parameter exceeds a predetermined threshold.

10. A system for electronically measuring tire wear, the system comprising:

a tire comprising a tread and a belt comprising a first and a second ply, the first and second plies being made up of substantially parallel metallic reinforcing cords embedded in a rubber composition that are inclined with respect to the equatorial plane of the tire, the cords of the first ply being inclined with respect to the cords of the second ply, wherein at least one dipolar electric element connects at least one cord of the first ply to at least one cord of the second ply to form a tire wear circuit, the path followed by the dipolar electric element between the cord of the first ply and the cord of the second ply extending into a part of the tread so as to be worn away before or upon reaching a tread wear limit, a measurement circuit for measuring a resonant frequency of the tire wear circuit;

a comparison circuit for comparing the measured resonant frequency to a predetermined frequency characteristic to determine a parameter indicative of tread wear; and a tread wear monitoring system configured to receive the tread wear parameter for generation of a tread wear indicator.

* * * * *